United States Patent [19]
Hasty

[11] 3,929,153
[45] Dec. 30, 1975

[54] GRAVITY HOT WATER CIRCULATING SYSTEM AND FLOW REGULATOR THEREFOR

[76] Inventor: William E. Hasty, 14038 Peyton Drive, Apt. 117, Dallas, Tex. 75240

[22] Filed: Mar. 11, 1975

[21] Appl. No.: 557,361

Related U.S. Application Data

[63] Continuation of Ser. No. 386,548, Aug. 8, 1973, abandoned.

[52] U.S. Cl. .............................. 137/337; 137/564
[51] Int. Cl.² .................................. E03B 11/06
[58] Field of Search .......... 137/334, 335, 336, 337, 137/564

[56] References Cited
UNITED STATES PATENTS

| | | | |
|---|---|---|---|
| 920,559 | 5/1909 | Fleming | 137/334 |
| 1,635,745 | 7/1927 | Ellis | 137/337 |
| 1,969,460 | 8/1934 | Glenn | 137/337 X |
| 2,255,460 | 9/1941 | Weaver | 137/337 X |
| 3,097,661 | 7/1963 | Lee | 137/564 X |

*Primary Examiner*—Alan Cohan
*Assistant Examiner*—Gerald A. Michalsky

[57] ABSTRACT

A system for continuously maintaining heated water at one or more fixtures which are connected to the outlet of a hot water heater. The fixtures are also return-connected to an inlet of the hot water heater by way of a flow regulator or valve having a valve head of plastic-like material which acts as a stop-check flow regulator float. The stop-check flow regulator float opens in response to the circulation of heated water in the return-connection and closes either in the absence of heated water in the return-connection or the introduction of cold water to be heated by the water heater to thereby prevent the cold water to be heated from entering the return-connection and disrupting circulation.

6 Claims, 8 Drawing Figures

FIG. 6
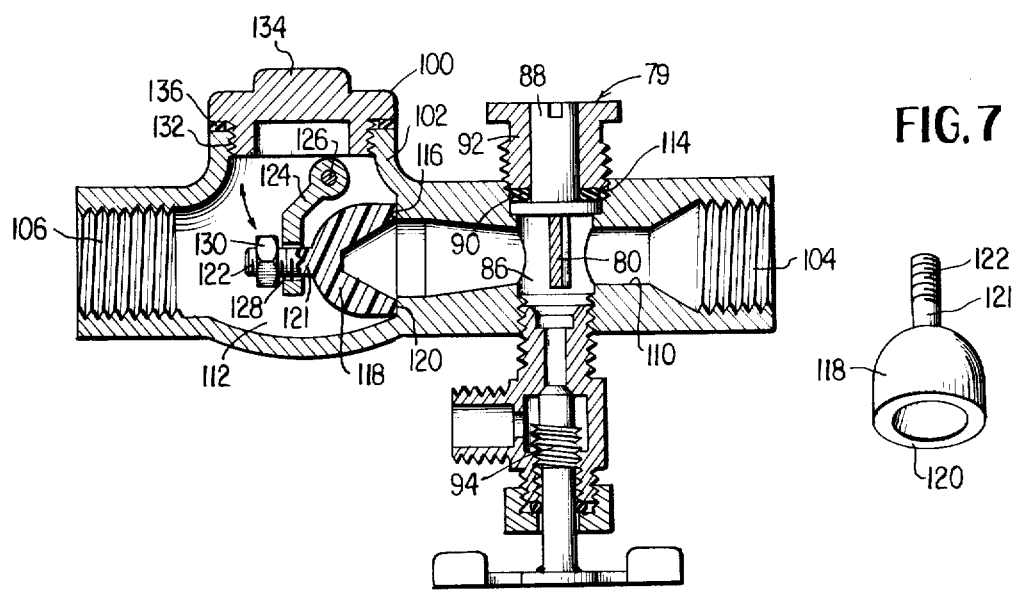
FIG. 7
FIG. 8
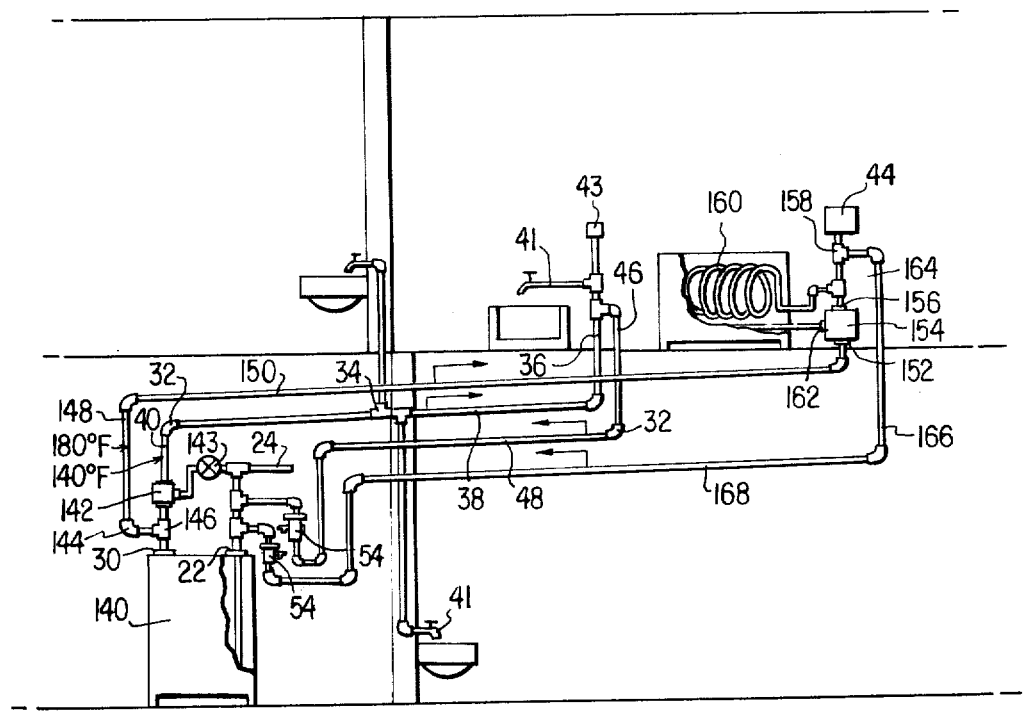

GRAVITY HOT WATER CIRCULATING SYSTEM AND FLOW REGULATOR THEREFOR

This application is a continuation of Ser. No. 386,548, filed Aug. 8, 1973, now abandoned.

DESCRIPTION OF THE PRIOR ART

The problem of providing instantaneous hot water at a fixture remote from a water heater has been with us a long time. Everyone is familiar with the inconvenience of waiting for hot water to arrive from the water heater as the cooled water preceeding it is run from the system. In addition to this inconvenience, the cost of the wasted cold water itself, the cost to heat it initially and the cost of disposing of it into a sewage system are significant over a short period of time.

Various attempts have been made to devise systems whereby the heated water is continuously circulated past the fixture and returned to the water heater in order to provide instantaneous hot water at the fixture at all times. Some prior art systems utilize the conventional cold water supply piping to return the hot water to the cold water inlet of the water heater with a check-type valve installed between the hot and cold water fixtures to prevent the intermixing of the hot and cold water as either fixture is opened. Systems of this type are shown, for example, in the U.S. Pat. Nos. to Chubb 1,247,374 and to Peters 2,842,155. The obvious disadvantage of this type of system is that once the circulation of hot water is established and the cold water fixture is opened, the circulating hot water must be run off and wasted before cold water arrives at the cold water fixture resulting in a disruption of hot water circulation which must then be reestablished over a long period of time.

Other prior art systems utilize a separate hot water return line to the cold water inlet of the water heater with a spring-biased valve installed between the hot water fixture and in the cold water supply line which closes as hot water is drawn from the fixture to thereby prevent cold water from entering the return line and disrupting the circulation of the hot water. Systems of this latter type are shown, for example, in the U.S. Pat. Nos. to Holmes 2,915,080 and to Walton 3,556,124. The disadvantage of these latter-type systems is that once the circulation of hot water is established the valve will fail to completely close if an insufficient amount of hot water is being drawn off at the hot water fixture, thus, permitting cold water to enter the hot water return line and disrupt the circulation of hot water. In addition, most plumbing codes will not permit the installation of a check valve in the cold water inlet line due to the possibility of explosion of the water heater if the check valve malfunctions.

Applicant's system overcomes the disadvantage of the aforementioned prior art hot water circulating systems by providing a system wherein hot water is always circulating past the hot water fixture without interruption and available for immediate use irrespective of the amount of hot water being drawn from the hot water fixture. In addition, applicant's valve is installed in the return line and not in cold water makeup line to hot water heater and thereby complies with plumbing codes.

SUMMARY OF THE INVENTION

The present invention is a system for maintaining heated water at a fixture at all times. Heated water is piped from a conventional water heater to one or more fixtures and back to an inlet of the water heater. A one-way flow regulator or valve of the check type is positioned in the return line as close as practical to the cold water inlet of the water heater. The flow regulator utilizes a unique valve head or stop-check flow regulator float which is made of a plastic-like substance having a specific gravity slightly greater than water. The flow regulator is positioned in the return line such that during start-up of the system, gravity maintains the stop-check flow regulator float in the closed position against the valve seat. As circulating heated water reaches the flow regulator, the slight pressure generated by the thermal currents in the heated water lifts the stop-check flow regulator float and completes the circulation path back to an inlet of the water heater. As heated water is drawn from the fixture creating a pressure differential between the heated water in the circulation line and the cold water being introduced to the water heater, the stop-check flow regulator float immediately moves to its closed position to thereby prevent cold water from entering the return line to disrupt the circulation of heated water and to prevent the heated water in the return line from being drawn off at the fixture. As the fixture is closed, the stop-check flow regulator float is again lifted to its open position by the aforementioned pressure and circulation of the heated water continues.

A dual system is also disclosed which utilizes a high capacity, high temperature water heater with the flow regulators of the present invention for providing continuously heated water at one temperature for fixtures, such as faucets and shower heads, and for providing continuously heated water for one or more fixtures, such as heating coil radiators for heating a room or entire residence, thereby eliminating the necessity of providing a separate heat source and hot water pump for the radiators as is presently required.

The stop-check flow regulator float can be slidably or pivotably mounted in a valve housing for movement into and out of engagement with a valve seat also positioned within the housing. The flow regulator valve also has associated with it a balancing valve for controlling the rate of circulation of hot water through the system and, thus, the temperature of the hot water available at any fixture.

BRIEF DESCRIPTION OF THE DRAWINGS

FIG. 6 is a cross-sectional view of another embodiment of the flow regulator of the present invention for horizontal operation and installation.

FIG. 7 is a perspective view of the stop-check float used in the valve of FIG. 6.

FIG. 8 is a side elevational view in diagrammatic form of a dual hot water circulating system containing two flow regulators of the present invention for vertical operation.

DETAILED DESCRIPTION OF THE PREFERRED EMBODIMENTS

Figure 1:
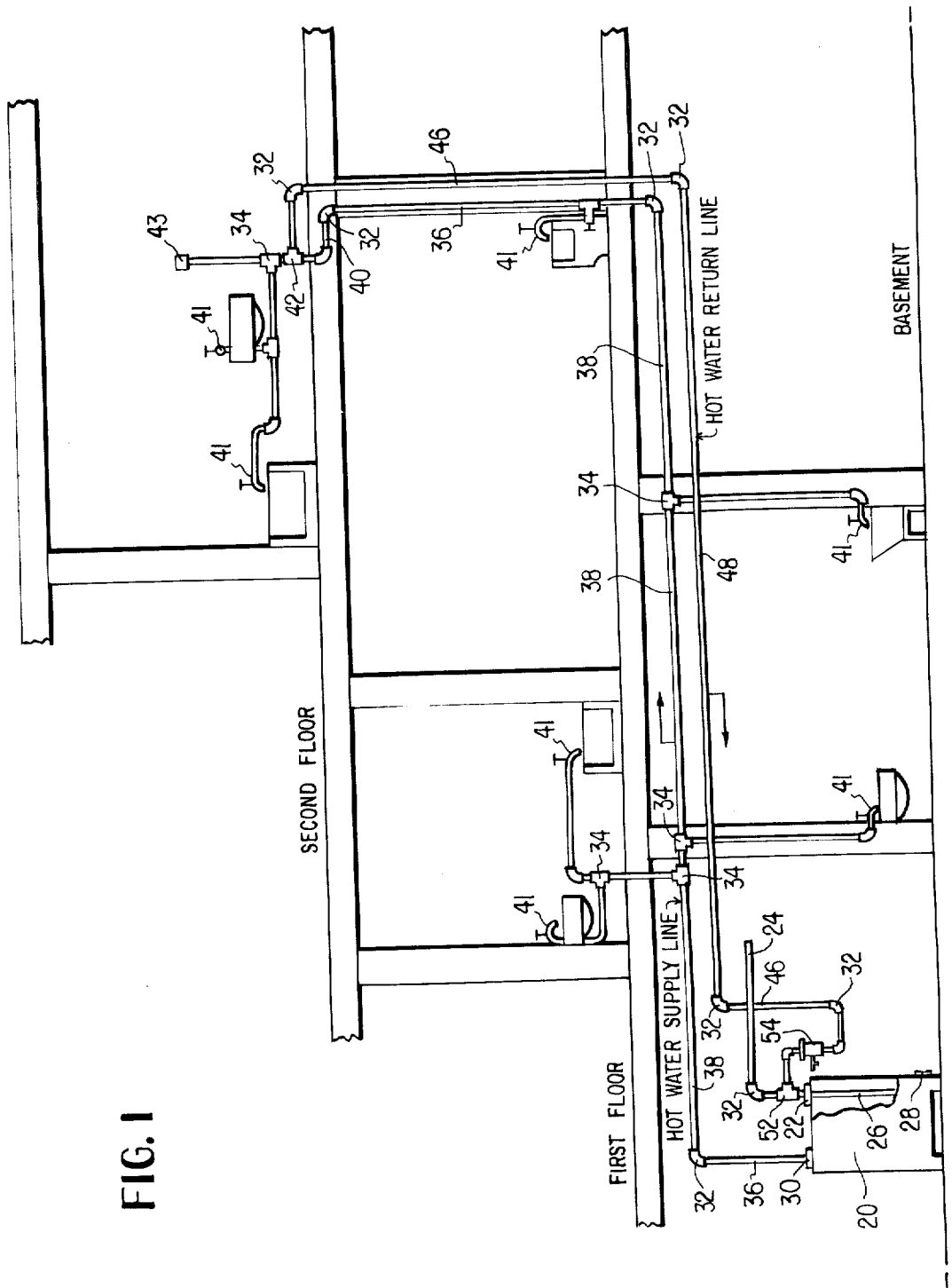
FIG. 1 is a side elevational view in diagrammatic form of a hot water circulating system containing the flow regulator of the present invention for vertical installation in a multi-story building.
Figure 2:
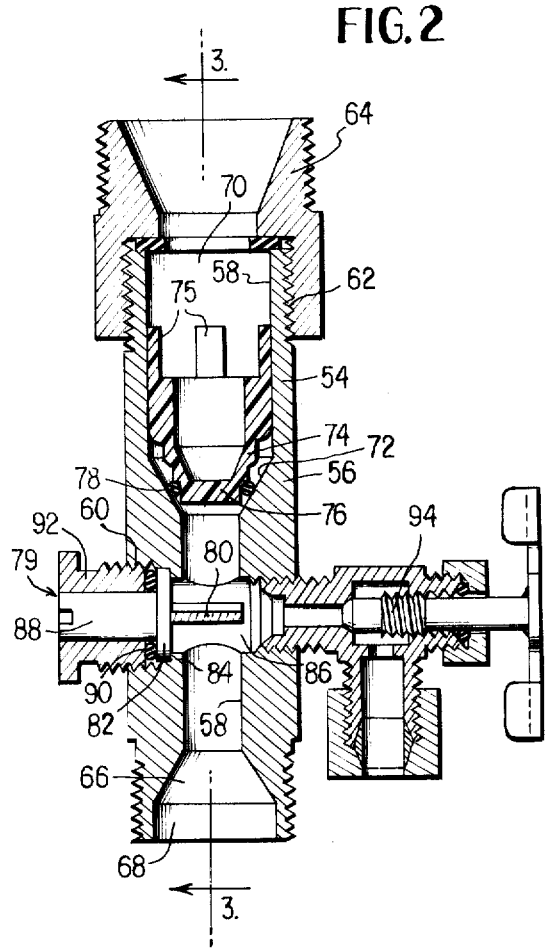
FIG. 2 is a cross-sectional view of one embodiment of the flow regulator of the present invention for vertical operation and installation.
Figure 3:
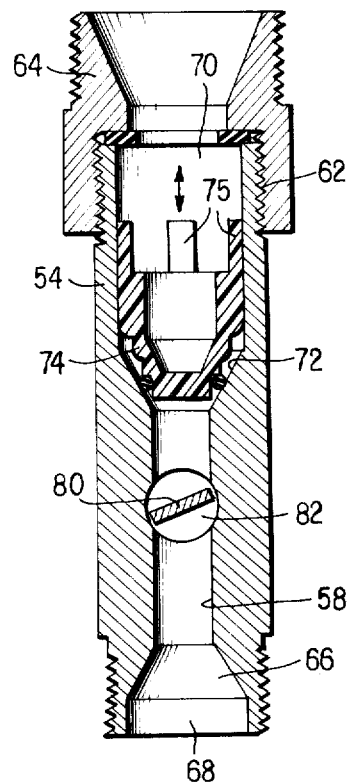
FIG. 3 is a cross-sectional view of the flow regulator of FIG. 2 taken along the lines 3—3 of FIG. 2.
Figure 4:
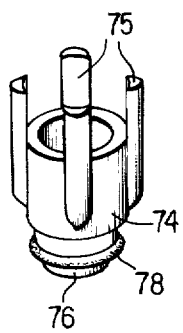
FIG. 4 is a perspective view of the stop-check flow regulator float in the valve of FIG. 2.

Referring now to the drawings wherein similar characters of reference represent corresponding parts in each of the several views.

With reference to FIGS. 1 – 4, a preferred form of the hot water system is shown having a conventional hot water heater 20 capable of supplying heated water in the 120° – 140°F., temperature range. The water heater 20 has an inlet 22 for connection by way of conduit or pipe 24 to a source of cold water such as the city mains. The inlet 22 is connected to an internal pipe 26 which extends to a point near the bottom of the water heater in order that incoming cold water will not temper the hot water at the top of the water heater. Some types of water heaters have an inlet 28 at the bottom thereof to introduce the water to be heated directly at the bottom.

The water heater 20 is also provided with an outlet 30 connected through suitable elbow connections 32 and T-connections 34 to various hot water conduits 36, 38, and 40 which are in turn connected to various corresponding fixtures 41 such as sink faucets, bathtub faucets, shower heads, etc., in the standard manner to form the hot water supply line of the system. Conduits 36 are those portions of the hot water supply line which rise in the vertical direction, conduits 38 are those portions of the supply line which are graded at an angle from the horizontal to the vertical direction, and conduits 40 are those portions of the supply line which extend in the horizontal direction. Conduits 38, connected between vertical conduits 36, are graded for two primary reasons: the first being to take advantage of the well-known principal that heated water tends to rise in the vertical direction, thus, grading improves circulation, and the second being that air also rises in the vertical direction in water and grading in the vertical direction facilitates its collection and removal at the highest point of the system. Good heat circulation and air removal can be achieved it has been found by grading the conduit 38 at a rate of one-half inch or more of rise in the vertical direction for every ten feet of conduit extending in the horizontal direction.

At the highest point of the system, conduit 40 is connected to a T-coupling 42 which in turn is connected via a T-coupling 34 to an air chamber 43. Manual venting of air chamber 43 is possible through fixtures 41 which are located above the hot water supply line.

The hot water return line is connected at one end to T-coupling 42 and is similar to the supply line as aforementioned. The return line consists of vertical extending conduits 46, graded conduit 48, and horizontal conduits 50. The conduit 48 is graded to facilitate heat circulation and air removal in much the same manner as corresponding conduits 38 in the supply line whenever the air chamber 43 is connected to a T-connection such as 34 which T-connection also serves to supply hot water to the most remote fixture in the system. It is necessary that the T-connection, such as 43 which provides a connection point for the return line, be installed below the T-connection 34 and not above it when the aforementioned manual venting is done through the faucet 41. Installation of the T-connection 42 above the T-connection 34 may result in an accumulated air lock below the air chamber 43 getting between the T-connections 34, 42 upon opening of the fixture and thereby disrupt water circulation. Grading of conduit 48 back towards the water heater 20 at the same rate as conduit 38 takes advantage of the well-known principal that cold will tend to flow downwardly. The return line is connected at its other end to T-coupling 52 via flow regulator 54. T-coupling 52 is also connected to cold water supply pipe 24 and inlet 22 of the water heater 20. The conduits forming the return line can be of a lesser diameter than the conduits forming the supply line in most cases and still have good circulation. The direction of hot water circulation through the supply and return lines is indicated by the arrows and such supply and return lines should always be installed above the level of the top of the water heater 20 to insure proper circulation of hot water through the system.

In the absence of flow regulator 54, hot water can be drawn from the water heater 20 through the supply and return lines and back to the water heater 20 and as long as the system remains a closed loop, i.e., no hot water is being drawn off at the fixtures 41, hot water will circulate in this loop with a reasonable degree of efficiency. However, once the loop is opened by drawing off hot water at any one of the fixtures 41, cold water not only enters the water heater 20 to replace the hot water being drawn off but it also enters the return line and thereby disrupts the circulation of hot water back to the water heater 20. Circulation may never be reestablished if hot water is frequently drawn off at the same or other fixtures.

Flow regulator 54, which will now be described, functions to permit the circulation of hot water through the return line back to the water heater when the loop is closed and will prevent cold water from entering the return line when the loop is opened by drawing off even the smallest amounts of hot water at a fixture 41, thus, maintaining constant circulation of hot water through the system and available at each fixture 41, almost instantly at all times.

Flow regulator 54 is basically a check-type flow regulator valve which is opened by flow in one direction and closed by either flow in the other direction or by gravity. Flow regulator 54 has a cylindrical-shaped housing 56 made of, for example, brass, non-ferrous, or plastic material with an axial bore 58 therethrough. A threaded bore 60 extends through the housing 56 transverse to and in communication with axial bore 58. The housing 56 has threaded end portions 62 for connecting the regulator directly to conventional conduit or by way of a threaded reducing bushing 64. It is immaterial for purposes of the present invention whether the connections to bores 58, 60 are threaded connections as illustrated or whether they are flared connections, compression fittings or other known types. The bore 58 forms a chamber 66 divided by the transverse bore 60 into two portions, one portion 68 of which is the inlet portion of the regulator and the other portion 70 is the outlet portion of the regulator. A valve seat 72, tapered and annular in shape is integrally formed in the outlet portion 70. A valve head 74 in the form a stop-check flow regulator float is located in the outlet portion 70 and is easily, axially slidable against the sidewalls of the outlet portion 70. The valve-head float 74 has an end portion 76 which is cylindrical in shape and which has a sealing ring 78 of the O type positioned thereon. The valve-head float 74 also has several extensions 75 formed therewith which serve a dual function. The first function being to permit the flow of water between the extensions 75 to the outlet 70 during normal operation and in the event that the valve-head float 74 should seal against bushing 64 which, in the absence of the extensions 75, would result in shutting off of the flow of water to inlet 22 of the water heater. The second function of extensions 75 is to act as guides to prevent the valve-head float portion 74 from binding in the bore 58. Water under pressure in the outlet portion 70 will force valve-head float 74 toward the valve seat 72 and O ring seal 78 into sealing engagement with the valve seat 72 to thereby prevent the water from entering the inlet portion 68. Such pressure would result whenever hot water is being drawn off at a fixture 41 and additional cold water is drawn into the water heater 20 to replace it. The valve-head float 74 is therefore made of a material such as plastic whose specific gravity is slightly greater than the specific gravity of water which is (1.0). Typical plastic materials suitable for use as a valve-head float 74 would have a specific gravity of between 1.05 and 2.0. An example of such a plastic material would be Delrin or Teflon. As is known, circulating heated water in a closed loop system exerts a very slight pressure which in part results from the expansion of the water molecules due to heat in the form of thermal currents in the water.

Applicant has discovered that this slight pressure can be effectively utilized to move a valve head if the valve head is freely movable or floating and is made of a material having a specific gravity slightly greater than water. Thus, when no water is being drawn off at one or more fixtures 41, heated water in inlet 68 exerts a slight pressure on the valve-head float 74 pushing it upward to thereby permit complete circulation of the water in the return line back to the water heater 20. As soon as even the smallest amount of hot water is drawn off at a fixture, the slight pressure exerted by the cold water entering the water heater 20 to replace it will push the valve-head float 74 to its closed position to thereby prevent any cold water from entering the return lines 46, 48, 50.

A balancing valve 79 is positioned in one portion of the transverse bore 60 and has a blade 80 which extends partially across the axial bore 58. The blade 80 has a collar 82 which engages a circular lip 84 formed in the bore 60 to thereby position the blade 80 so that a small gap or passageway 86 will always exist adjacent the end of the blade 80. The collar 82 has a shaft 88 extending therefrom which when rotated also rotates the blade 80. A sealing ring 90 of the O ring type is positioned over the shaft 88 and adjacent the collar 82. A threaded bushing 92 is also provided which, when tightened into the bore 60, engages the O-ring seal 90 to prevent the leakage of water. As the blade 80 is rotated from a position substantially parallel to the axis of bore 58 to a position substantially transverse thereto, the rate of flow of water from the inlet 68 to the outlet 70 is gradually reduced. By so controlling the rate of flow of hot water through the flow regulator 54, the rate of circulation of the water through the system can be controlled which in turn determines the temperature of the water available for use at the fixtures 41. This is because a faster rate of circulation through the system enables more heat from the water to be dissipated by the supply and return lines and conversely a slower flow rate results in less heat dissipation. The passageway 86 insures, however, that there will always be a flow of a certain rate through control valve 54 in order that uninterrupted circulation is maintained at all times.

The flow regulator 54 also has a small conventional drain valve 94, one end of which is positioned in the transverse bore 60. Drain valve 94 enables cold water to be drained from the return line which may be present during initial start-up of the system. As soon as hot water reaches the inlet 68 of the control valve 54, the slight pressure exerted thereby as aforementioned will raise valve-head float 74 to establish continuous circulation through the entire system. It should be pointed out that it is to be considered within the scope of applicant's invention to install the flow regulator 54 in an inverted position relative to that as viewed in FIGS. 2 and 3. When installed in the inverted position, the valve-head float 74 would be made of a material having a specific gravity slightly less than the specific gravity of water. An example of such a plastic material would be poly-propolene or poly-ethelene.

Figure 5:
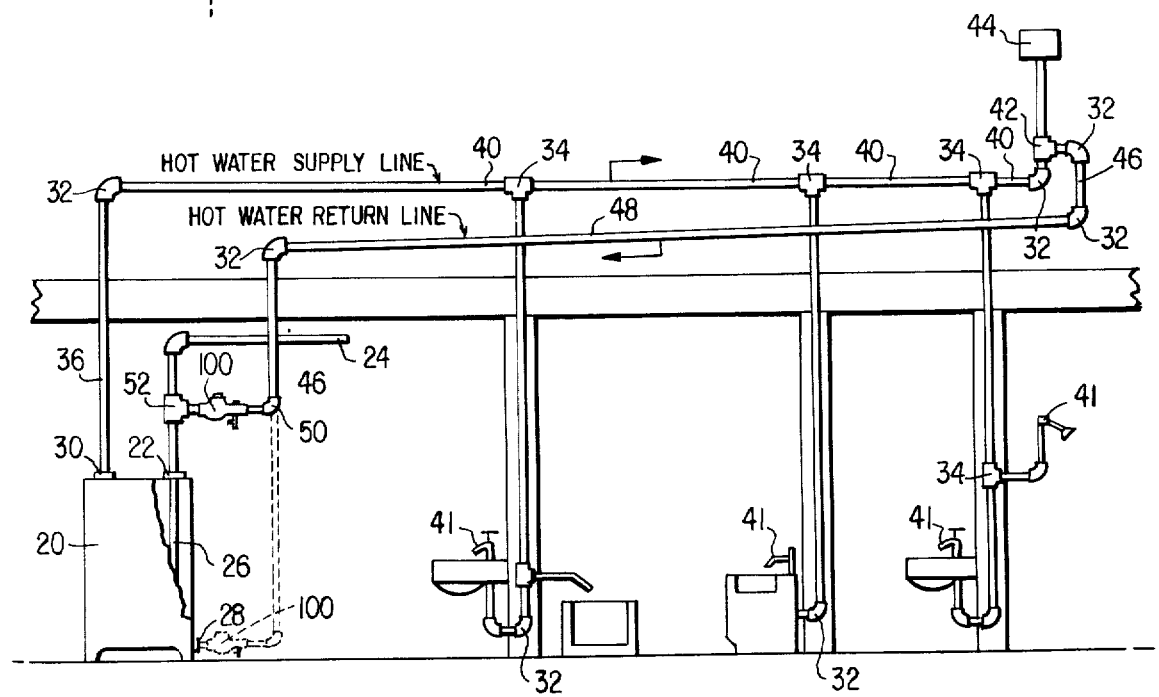
FIG. 5 is a side elevational view in diagrammatic form of a hot water circulating system containing the flow regulator of the present invention for horizontal installation in a single-story building.

FIG. 5 illustrates how, by adding a graded return line and flow regulator of the present invention, an existing hot water system can be converted to a circulating system for providing instantaneous hot water at one or more fixtures 41. As is typical in most existing hot water systems, the supply line conduit 36 extends vertically from the outlet 30 of the water heater and is connected to conduit 40 which extends horizontally or level with the ground to various points where, by means of T-connections 34, hot water fixtures 41 can be connected thereto. The hot water supply line would then be terminated at the fixture 41 most remote from the water heater 20. Before hot water can be drawn from any of the fixtures 41 in such an existing system, all of the water in the supply line which has cooled must be first drained at a fixture and wasted. Such an existing hot water system can be easily converted to one for providing instantaneous hot water. An automatic air vent 44 provides a means for removing air from the existing supply line and the T-connection 42 provides a point of connection for a return line. Air vent 44 functions to open and permit accumulated air to be removed from the supply line as such accumulated air reaches a predetermined volume. Air vent 44 remains closed at all other times to prevent water under pressure from escaping. An example of air vent 44 is Model No. 75 manufactured and sold by the Maid-O'-Mist Company and would be used when no fixture 41 is connected adjacent T-connection 42 to permit manual venting as described with respect to FIG. 1. The return line consists of vertical conduit 46 and graded conduit 48 which is identical with that shown in FIG. 1. The return line must be connected to a vertical section of the supply line and not a horizontal section 40 in order to insure proper circulation of the heated water without disruption due to accumulated air below automatic air vent 44. The return line is shown connected to another embodiment of a flow regulator of the present invention indicated generally by reference numeral 100 and will be described in detail shortly. The flow regulator 100 is installed in the horizontal position whereas flow regulator 54 is installed in the vertical position as previously mentioned. Flow regulator 100 can be connected between the end of the return line and T-coupling 52 or it can be connected between the end of the return line and inlet 28 of the water heater 20 as shown by the phantom lines. By simply installing an air vent 44, graded return line 48, and either flow regulator 54 or 100 to any existing hot water supply line in the manner just described and shown in FIG. 5, effective circulation of hot water back to the water heater 20 can be achieved to thereby provide substantially instantaneous hot water at any of the fixtures connected to the hot water supply line.

FIGS. 6 and 7 show an embodiment of a flow regulator 100 for installation in the horizontal position. Flow regulator 100 would be used, for example, where existing piping makes it impossible or impractical to connect a vertically operating control valve 54. Flow regulator 100 has a housing 102 made of, for example, brass, non-ferrous or plastic material having a threaded inlet end 104 with an enlarged open chamber 112. The outlet 106 is also connected to chamber 112. A threaded bore 114 extends through the housing 102 transverse to and in communication with axial bore 110. An annular valve seat 116 is integrally formed with the housing 102 at the point where the axial bore 110 enters the chamber 112. A valve head 118 is provided having an annular end portion 120 substantially the same size and shape as the annular valve seat 116. The valve head 118 would normally be made of one of the materials previously set forth with regard to valve-head float 74 having a specific gravity slightly greater than water. The valve head 118 also has a cylindrical-shaped shaft 121 extending therefrom and terminating at a threaded end portion 122. The valve head 118 is held in a position opposite the valve seat 116 by means of an arm 124 which is pivotably secured at one end to a shaft 126. The shaft 126 is also formed integrally with the housing 102. The arm 124 has a cylindrical recess 128 through which is positioned the shaft 121 of valve head 118. The shaft 121 is held in the recess 128 by means of a threaded lock nut 130. The valve head 118 is normally maintained in engagement with valve seat 116 by means of gravity when the valve housing 102 is in the horizontal position as viewed in FIG. 6. When the flow regulator 100 is installed between the end of the return line and water heater 20 as shown in FIG. 5, the pressure exerted by thermal currents in the return line and axial bore 110 will cause the valve head 118 to pivot away from the valve seat 116 to thereby permit the water to enter chamber 112 and flow out outlet 106 back to the water heater 20. Whenever hot water is drawn from the system at any fixture, the cold water entering the water heater 20 to replace it will exert a pressure greater than the pressure exerted by the thermal currents and the valve head 118 will pivot toward the valve seat 116 to thereby prevent any cold water from entering the return line to disrupt the circulation of hot water. A balancing valve identical with balancing valve 79 previously described has one end positioned in one portion of transverse bore 114 and functions to control the temperature of the water in the supply line in the same manner as aforesaid with respect to control valve 54. A passageway 86 is also provided between the bore 110 and the end of blade 80 to provide the continuous flow of water past the balancing valve 79 even when the blade 80 is in its closed position transverse to the bore 110. A drain valve 94 is located in the other portion of transverse bore 114 for draining the system of cold water whenever necessary to establish initial circulation of hot water in the return line. The housing 102 also has a threaded recess 132 which communicates with chamber 112 to enable the arm 124, valve head 118 or lock nut 130 to be installed or replaced. A threaded cap 134 and sealing washer 136 are also provided for closing the recess 132.

FIG. 8 shows a dual system, one part of which is capable of providing continuously heated water at one temperature for use at fixtures, such as those disclosed at 41 in FIGS. 1 and 5, and the other part of which is disclosed for providing continuously heated water at another higher temperature for coil heat radiators to heat a room or residence.

A water heater 140 is of the type capable of providing large quantities of heated water in the 180° – 200°F., temperature range. The water heater 140 has an inlet 22 for supplying cold water from a cold water inlet pipe 24, and an outlet 30 for supplying heated water at the aforementioned temperatures of 180° – 200°F. The outlet 30 is connected via hot water tempering valve 142 to hot water supply line conduits 36, 38, 40 which are in turn connected to fixtures 41 in the same manner as shown in FIG. 1. The hot water tempering or blending valve 142 is also connected to the cold water inlet pipe 24 via a conventional check valve 143 and serves as a valve for mixing the 180° – 200°F., hot water from the outlet 30 with a sufficient amount of cold water from inlet pipe 24 to thereby maintain the temperature of the mixture at approximately 140°F., which is suitable for human use. Such mixing valves are commercially available, one such valve being manufactured and sold by the Sarco Manufacturing Company or Watts Regulator Company. Check valve 143 is installed between the tempering valve 142 and inlet pipe 24 in order to prevent heated water from the water heater 140 or tempered water from the supply line from entering the inlet 22 of the water heater when heated water is being drawn from a fixture 41 and additional cold water is drawn from inlet pipe 24 to replace it. The supply line conduit is connected to an air chamber via T-connection 42. The T-connection 42 is connected to the inlet 22 of the water heater 140 via vertical return line conduits 46, graded conduits 48, and flow regulator 54 (or 100 if required) to complete the graded circulating system which is substantially identical in construction and operation as that previously described with respect to FIG. 1.

The outlet 30 is also connected through suitable elbow connections 144 and T-connections 146 to various vertical hot water supply conduits 148, graded hot water supply conduits 150, and the inlet 152 of a three-way, modulating-type butterfly valve 154. A first outlet 156 of the butterfly valve 154 is connected to an automatic air vent 44 via T-connection 158 to thereby complete the 180° – 200°F., hot water supply line for a coil heat radiator 160. The radiator 160 has one end thereof connected to a second outlet 162 of the butterfly valve 154 and the other end thereof connected back to vertical supply conduit 148 via T-connection 164. The butterfly valve 154 serves to direct the hot water entering inlet 152 to either the first outlet 156, second outlet 162 or some proportion in between in response to the temperature of the water sensed at the outlet 156. By so controlling the amount of hot water entering the radiator 160, the temperature of the heat being radiated therefrom can be controlled. The three-way, butterfly valve 154 is commercially available, an example, being manufactured and sold by the Powers Regulator Company or Minneapolis Honeywell Company.

The T-connection 158 is connected to inlet 22 of the water heater 140 via vertical return line conduits 166, graded conduits 168 and flow regulator 54 (or 100 if required) to complete the graded circulating system for the radiator 160. The operation of the circulating system for radiator 160 is basically the same as the circulating system for the fixtures 41 previously discussed. The balancing valve 79 associated with flow regulator 54 is first adjusted to control the temperature of the water circulating through the system by controlling the degree of flow of hot water through the flow regulator 54. The butterfly valve 154 is then adjusted to control the amount of hot water which actually flows through the radiator 160 to thereby control the temperature of the heat being radiated thereby. Circulation of hot water will be continuous throughout the system irrespective of the amount of hot water being diverted from the supply line through the radiator 160 by means of butterfly valve 154 because the amount of hot water entering inlet 152 and that leaving first outlet 156 will always be the same. In addition, when water is being drawn off at one or more of the fixtures 41, both flow regulators 54 will immediately close to prevent incoming cold water from entering and disrupting circulation in both return lines.

Applicant has thus disclosed three types of graded circulating systems employing his novel flow regulators for providing heated water for immediate use at one or more fixtures remote from a water heater as well as a dual graded circulating system also employing his novel flow regulators for providing, in addition, continuously circulating heated water for one or more radiators, thus, eliminating the cost of furnaces, water pumps and other expensive associated equipment required in present day home or office heating systems.

It is to be understood that the disclosure is given by way of illustrative example only, rather than by way of limitation, and that without departing from the invention, the details may be varied within the scope of the appended claims.

What is claimed is:

1. A system for maintaining heated water at one or more fixtures, said system comprising:
   a. fixture means,
   b. water heater means having an inlet for introducing cold water to be heated to said water heater means and an outlet, said outlet being connected by piping to said fixture means for supplying heated water to said fixture means, said fixture means being further connected by piping to said inlet for returning heated water to said inlet, at least a portion of said return piping being graded with respect to the horizontal to facilitate movement of said heated water in the vertical direction and to permit any air present in said return piping to easily rise to the highest point in the system to thereby insure the required circulation of said heated water in said return piping,
   c. air vent means connected to said return piping at said highest point for permitting said air to be dispelled from said system; and
   d. flow regulating means connected between said fixture means and said cold water inlet, said flow regulating means having a valve head which is closed by gravity during the absence of circulating heated water in said return piping and during the introduction of cold water at said inlet to thereby prevent said cold water from entering said return piping and disrupting said circulation, and said valve head being opened in response to pressure exerted adjacent said valve head by the circulating heated water in said return piping between said fixture means and said flow regulating means to thereby permit the return of heated water to said cold water inlet and maintain heated water at said fixture means.

2. A system as set forth in claim 1 wherein said fixture means comprises a plurality of separate fixtures connected at various locations to said heated water supply piping, the last of said fixtures being at a location furthest from said water heater means, and said return piping being connected to said supply piping at said furthest location.

3. A system as set forth in claim 1 wherein said flow regulating means is a stop check-type float valve.

4. A system as set forth in claim 1 wherein said valve head is made of plastic-like material.

5. A system as set forth in claim 1 wherein at least a portion of said supply piping is graded with respect to the horizontal.

6. A system as set forth in claim 5 wherein the rate of grade of said graded portion is approximately one-half inch for every ten feet of piping.

* * * * *